(12) United States Patent
Decker et al.

(10) Patent No.: US 9,605,460 B2
(45) Date of Patent: Mar. 28, 2017

(54) HINGE DAMPENING DEVICE FOR GRANULATION BOWL LID

(71) Applicant: Freund—Vector Corporation, Marion, IA (US)

(72) Inventors: Nicholas Decker, Cedar Rapids, IA (US); Nigel P. Wright, Marion, IA (US)

(73) Assignee: Freund—Vector Corporation, Marion, IA (US)

( * ) Notice: Subject to any disclaimer, the term of this patent is extended or adjusted under 35 U.S.C. 154(b) by 0 days.

(21) Appl. No.: 14/606,436

(22) Filed: Jan. 27, 2015

(65) Prior Publication Data

US 2016/0215546 A1 Jul. 28, 2016

(51) Int. Cl.
| | | |
|---|---|---|
| *E05D 11/08* | (2006.01) | |
| *B01J 2/10* | (2006.01) | |
| *E05D 3/02* | (2006.01) | |

(52) U.S. Cl.
CPC .............. *E05D 11/087* (2013.01); *B01J 2/10* (2013.01); *E05D 3/02* (2013.01); *E05Y 2900/604* (2013.01); *Y10T 16/5403* (2015.01)

(58) Field of Classification Search
CPC ......... E05D 11/087; E05D 5/121; E05D 3/02; E05D 2005/122; B01J 2/10; Y10T 16/5386; Y10T 16/540345; Y10T 16/5403; Y10T 16/54038; E05Y 2900/604
USPC ................... 16/340, 298, 337, 342; 118/417
See application file for complete search history.

(56) References Cited

U.S. PATENT DOCUMENTS

| | | | |
|---|---|---|---|
| 4,615,556 A | 10/1986 | Stahel | |
| 4,630,332 A * | 12/1986 | Bisbing | E05D 11/087 16/262 |
| 4,639,147 A * | 1/1987 | Schwarz | A47K 13/12 114/144 R |
| 4,805,265 A | 2/1989 | Ehm et al. | |
| 5,653,001 A * | 8/1997 | Lane | E05C 17/045 16/340 |
| 7,469,448 B1 | 12/2008 | Forester et al. | |
| 8,205,304 B2 * | 6/2012 | Le | E05D 11/081 16/340 |
| 8,272,103 B2 | 9/2012 | Kim | |
| 8,307,503 B1 | 11/2012 | Burger | |
| 2007/0136994 A1 * | 6/2007 | Hu | F16M 11/10 16/340 |
| 2009/0100640 A1 | 4/2009 | Chern | |
| 2010/0011536 A1 | 1/2010 | Lin | |
| 2010/0139042 A1 | 6/2010 | Chang | |

* cited by examiner

*Primary Examiner* — William Miller
(74) *Attorney, Agent, or Firm* — McKee, Voorhees & Sease, PLC (57) ABSTRACT

A hinge dampening device is provided for a granulation processor having a bowl and a lid. A dampening device includes first and second spaced apart hinge supports fixed to the bowl and a pin extending through the lid collar residing between the hinge supports. The first end of the pin is fixed to the first hinge support, and a second end of the pin extends through the second hinge support. An adjustable compressive force is applied axially to the hinge supports and lid collar to create frictional resistance to rotation of the lid. The rotational resistance provides controlled opening and closing of the lid.

12 Claims, 8 Drawing Sheets

HINGE DAMPENING DEVICE FOR GRANULATION BOWL LID

FIELD OF THE INVENTION

The invention relates to the field of granulation processors and particularly to a lid hinge dampener for a granulation bowl.

BACKGROUND OF THE INVENTION

Granulation mixing systems exist in several forms. One form is a bottom drive, high sheer, wet granulation mixer having a bowl with rotary mixing blades and a lid which removably covers the bowls. The bowls and lids come in various sizes, with the lids of bigger bowls being substantially heavier than for smaller bowls. As the lid weight increases, control of the opening and closing movement of the lid becomes more difficult. Accidental slamming of the lid creates a risk of injury to the operator. Some prior art granulation bowls includes a hydraulic or pneumatic cylinder to control opening and closing of the lid. Other prior art granulation bowls include a counter weight on the lid to assist in controlled opening and closing. However, these structures add more cost to the granulator.

Therefore, a primary objective of the present invention is the provision of a hinge dampening device for a lid of a granulator processor.

Another objective of the present invention is the provision of a granulator processor with improved means for controlling opening and closing of the lid over the bowl.

A further objective of the present invention is the provision of an improved hinge for a granulator processor which minimizes the overall weight of the processor.

Still another objective of the present invention is the provision of a hinge dampening device for a granulator processor lid which is economically manufactured, easy to assemble, and durable and effective in use.

These and other objectives will become apparent from the following description of the invention.

SUMMARY OF THE INVENTION

The hinge dampening device of the present invention is used on a granulation processor having a bowl with a hinged lid movable between open and closed positions. The hinge includes a pair of spaced apart hinge supports fixed onto the bowl. The lid has a collar which extends between the supports and through which a hinge pin extends. The first end of the pin is fixed to the first support by bolts to preclude rotation of the pin. The second end of the pin extends through the second support. Belleville washers are placed over the protruding second end of the pin. A jam nut and a locking acorn nut are threaded onto the second end of the pin and can be turned in opposite directions to increase or decrease the axial compression on the hinge supports and lid collar, and thereby provide adjustable, frictional rotational resistance for controlled opening and closing of the lid.

DETAILED DESCRIPTION OF THE PREFERRED EMBODIMENTS

A granulation processor is generally designated by the reference number 10 in the drawings. The processor 10 includes a bowl 12 with a lid 14 movable between a closed position covering the top of the bowl 12 and an open position allowing access to the interior of the bowl 12.

The hinge dampening device is generally designated by the reference number 16. The dampening device 16 includes first and second hinge supports 18, 20 fixed to the bowl 12, using bolts or screws 21 or other securement means, in a spaced apart relationship. A pin 22 has a first end 24 extending into the first support 18 and fixed to the support 18 by one or more bolts 25 or other fasteners, so as to prevent rotation of the pin 22. The second end 26 of the pin extends through the second support 20. The pin 22 extends through a collar 28 of the lid 14 which resides between the hinge supports 18, 20. A pair of flanged bushings 30 are press fit into the opposite ends of the collar 28 before the pin 22 is inserted there through.

One or more Belleville washers 32 are positioned over the second end 26 of the pin 22 so as to engage the second hinge support 20. A flat washer 34 is then placed over the second end 26 of the pin 22, followed by a jam nut 36 and an acorn nut 38. The nuts 36, 38 can be turned on the threaded end 26 of the pin 22 so as to increase or decrease the axial or compressive load or force on the hinge supports 18, 20, the bushings 30 and the lid collar 28. This compressive force creates frictional resistance during movement of the lid between the opened and closed positions. The frictional resistance causes the lid 14 to resist rotation about the pin 22, thus dampening the pivotal movement of the lid 14. The dampening device 16 allows the lid to be opened or closed to any angular position relative to the bowl 12 within the range of movement of the lid 14, and the lid will stay in a set position, or alternatively, the lid may slowly open or close so as to preclude slamming and injury to the operator.

The lid 14 may also include one or more arms 40 to which a counterweight or counterbalance 42 can be mounted. With the dampening hinge device 16, the weight of the counterbalance 42 can be minimized.

In order to adjust the compression force, and thus the rotational resistance on the lid 14, the bolts or screws 21 for the hinge supports 18, 20 must be loosened, and then the jam nut 36 and acorn nut 38 can be turned to increase or decrease the compression on the Belleville washers 32. When the bolts or screws 21 are then tightened to the bowl 12, there tends to be a slight decrease in the compressive force, and thus a decrease in the rotational resistance for the lid 14. To eliminate this loss of compression, an alternative hinge dampening device 16A (FIGS. 7 and 8) can be used on the granulation processor 10. The alternative device 16A includes hinge supports 18A, 20A, and a pin 22A, with opposite first and second ends 24A, 26A. The first end 24A of the pin 22A is received in the first hinge support 18A, while the second end 26A of the pin 22A extends through the second hinge support 20A, similar to the first embodiment of the hinge dampening device 16. In the alternative embodiment of the dampening device 16A, the flanged bushing 30 is replaced with a non-flanged bearing 30A press fit into the ends of the lid collar 28. The alternative embodiment also includes a pair of thrust bearings 31A extending around the pin 22A at opposite ends of the collar 28. The pin 22A includes a shoulder 46 adjacent the first hinge support 18A.

Figure 1:
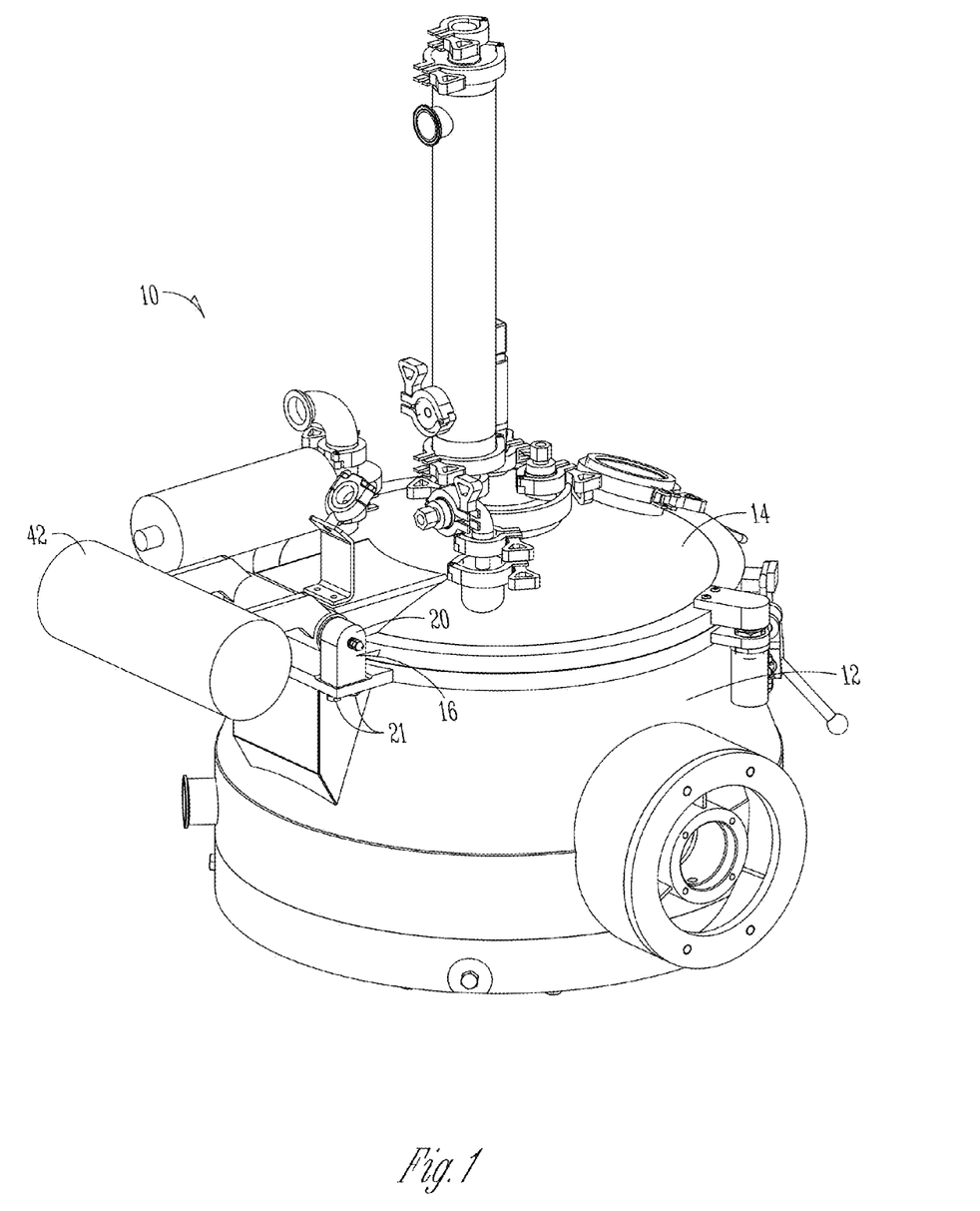
FIG. 1 is a perspective view of a granulation processor according to the present invention with the lid in a closed position.
Figure 2:
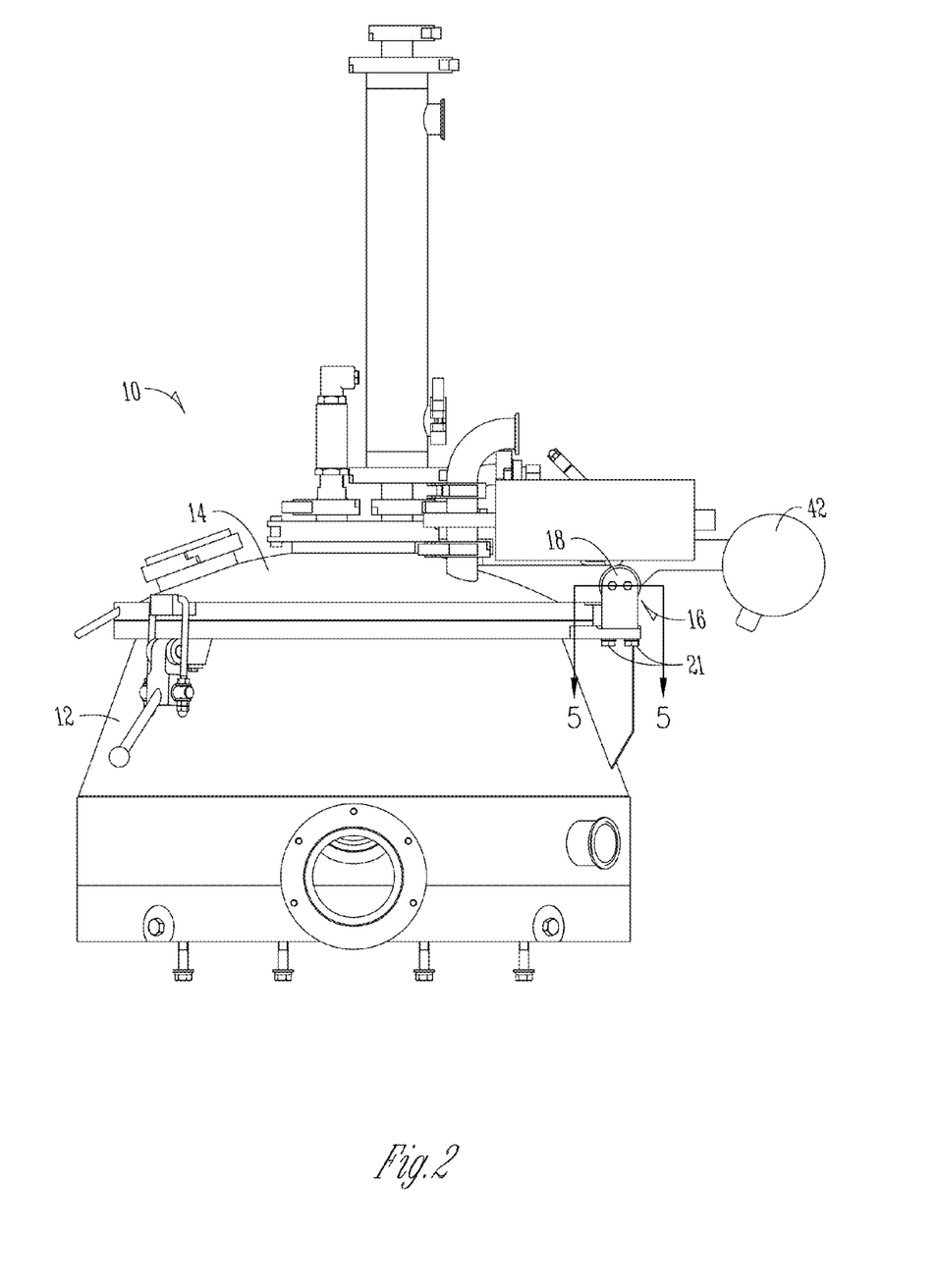
FIG. 2 is a side elevation view of the processor with the lid closed.
Figure 3:
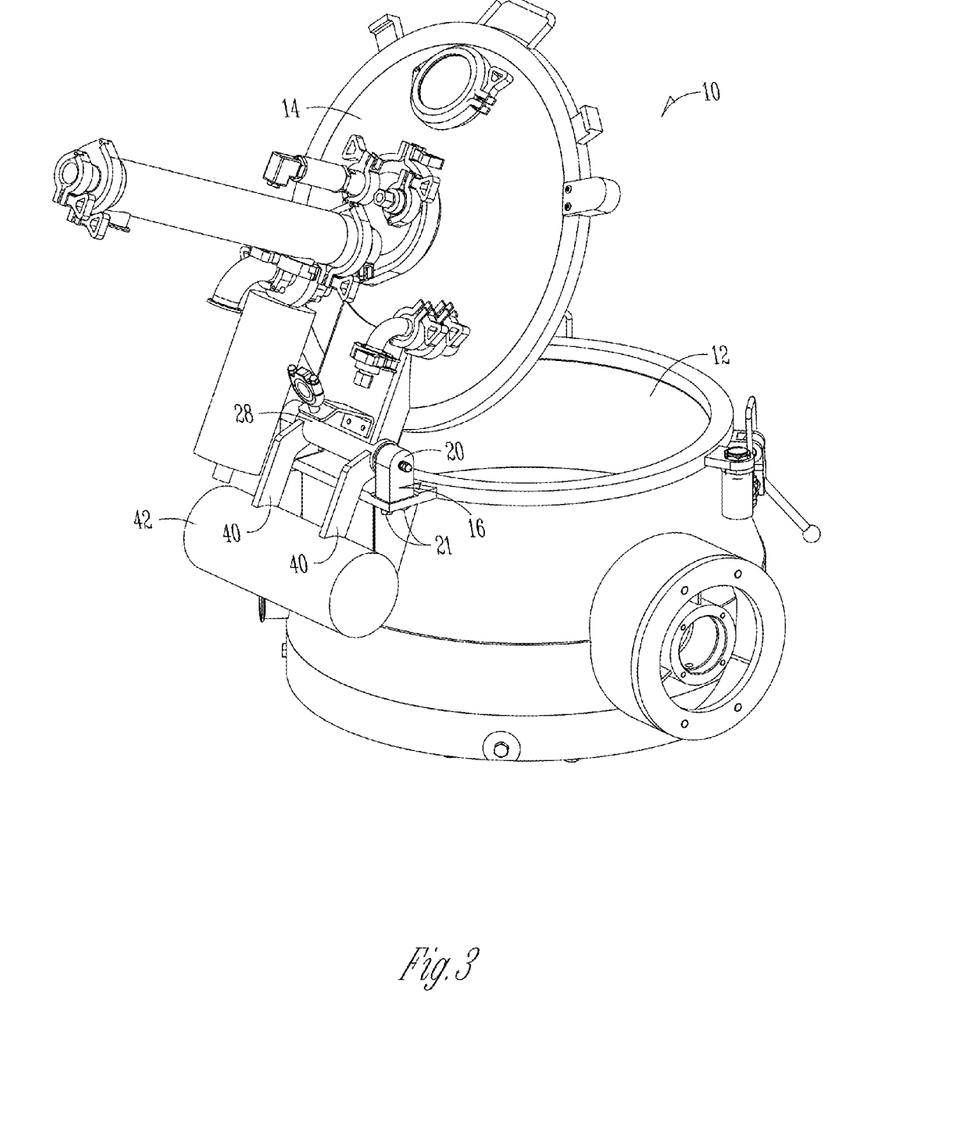
FIG. 3 is a perspective view of the processor with the lid in an open position.
Figure 4:
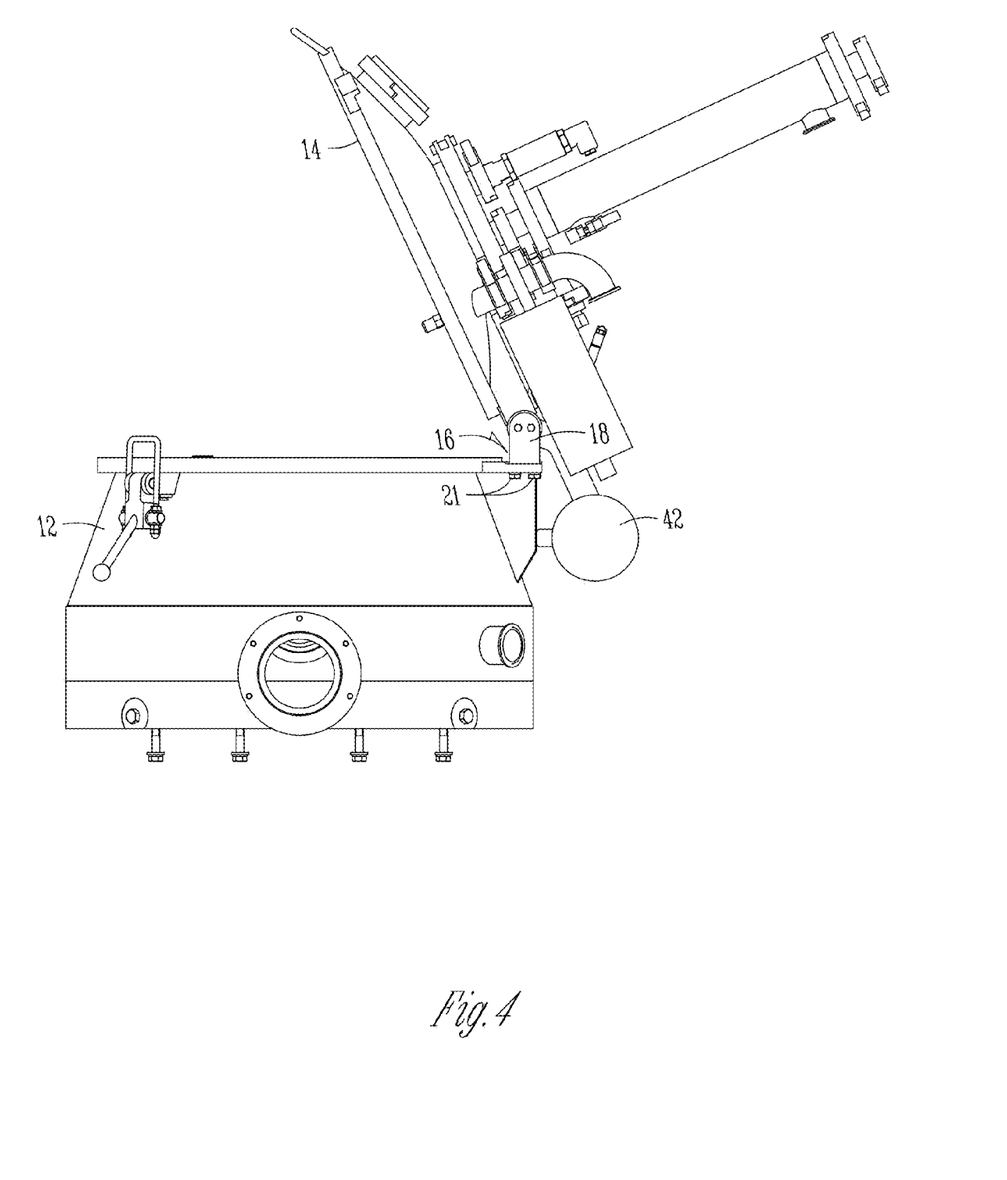
FIG. 4 is a side elevation view of the processor with the lid opened.
Figure 5:
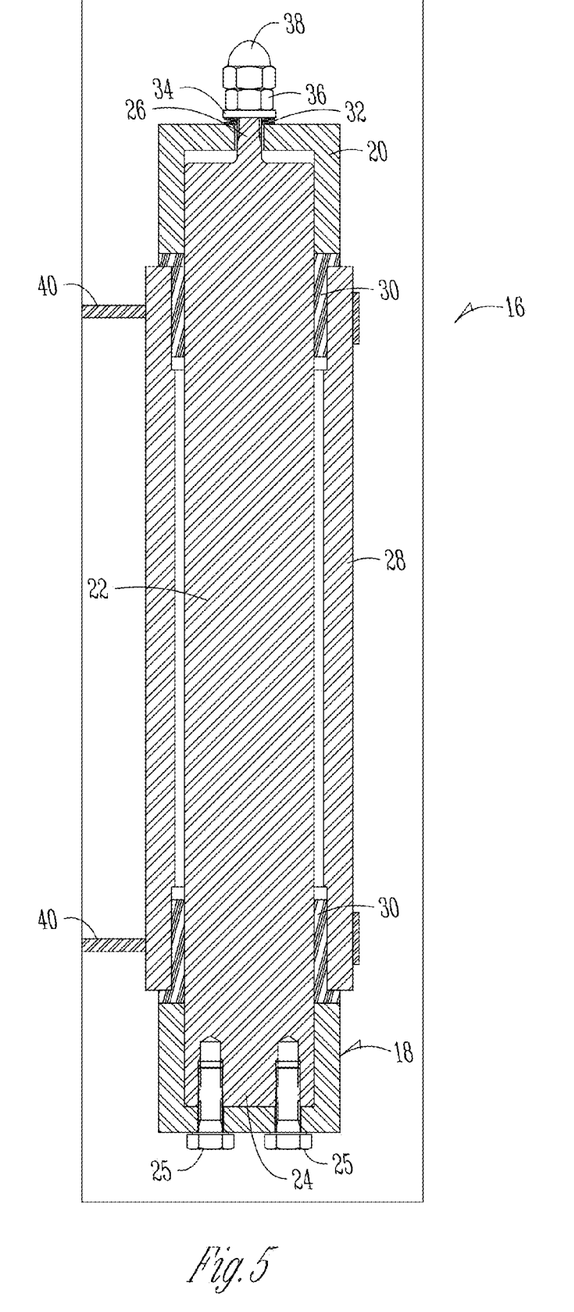
FIG. 5 is a sectional view of the hinge dampening device taken along lines 5-5 of FIG. 2.
Figure 6:
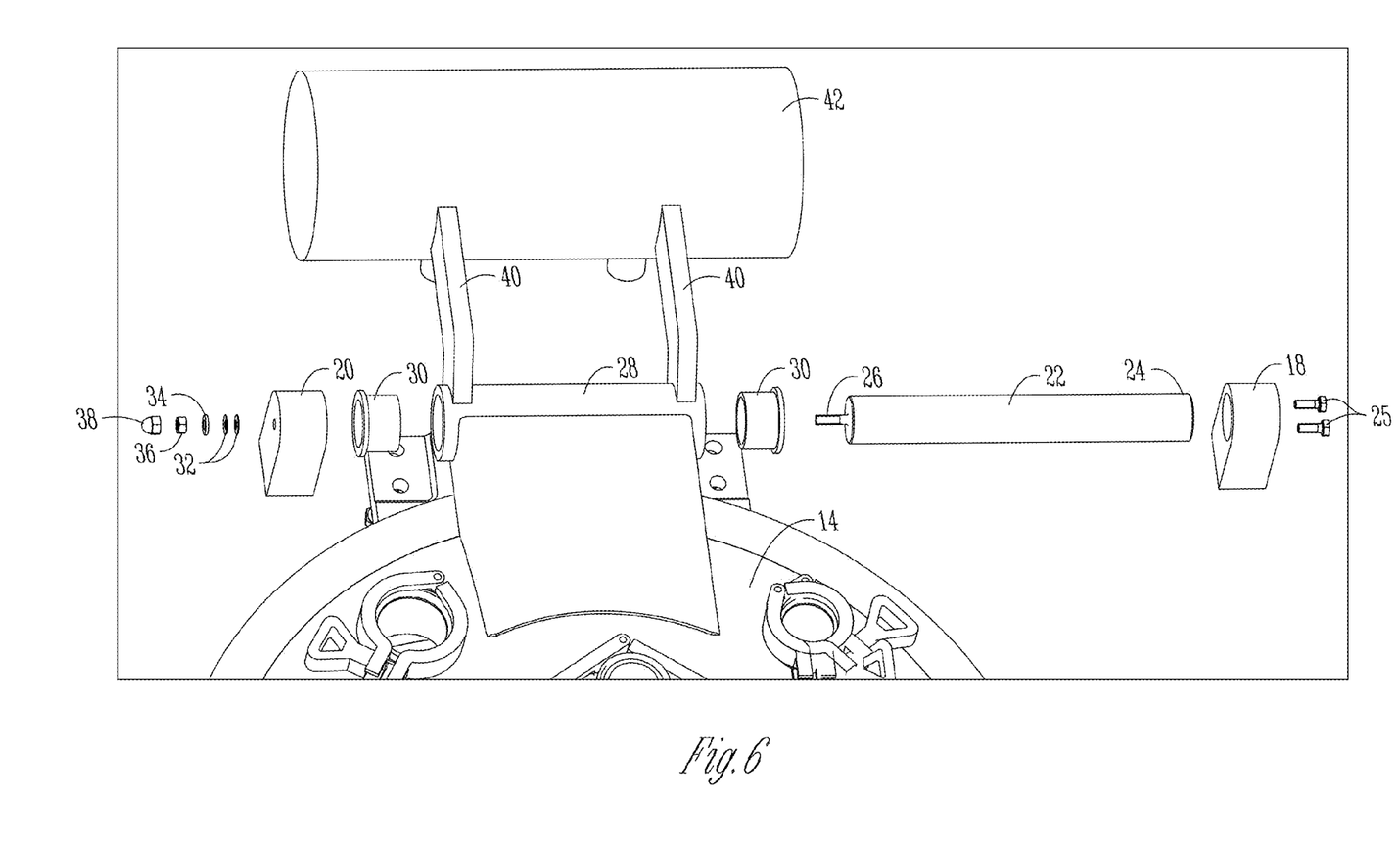
FIG. 6 is an exploded perspective view of the hinge dampening device.
Figure 7:
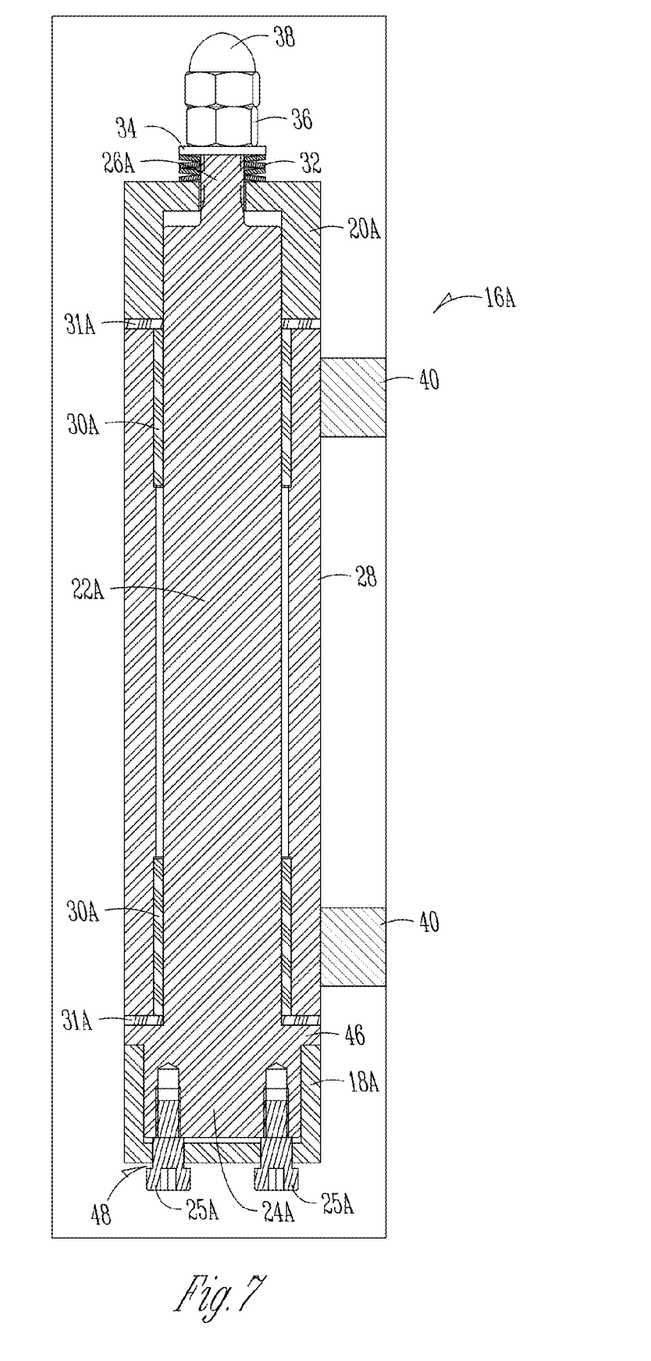
FIG. 7 is a sectional view of an alternative embodiment of the hinge dampening device, according to the present invention.
Figure 8:
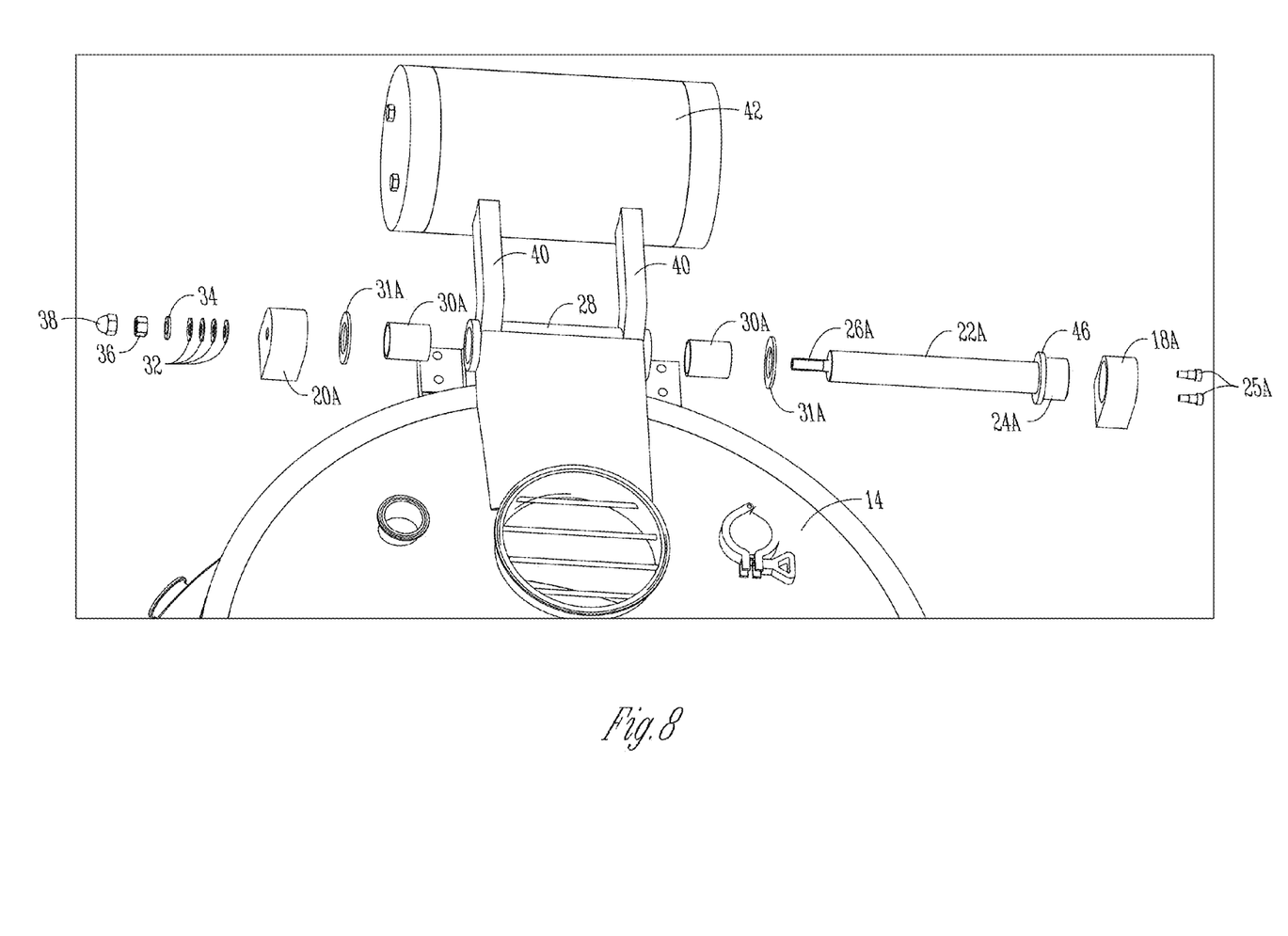
FIG. 8 is an exploded view of the alternative embodiment.

In the alternative embodiment dampening device 16A, the first hinge support 18A is not in compression, as in the first embodiment dampening device 16 and its first hinge support 18. The shoulder 46 of the alternative pin 22A compresses the thrust bearing 31A on that end of the pin, so as to allow the hinge support 18A to be secured to the bowl 12 with the bolts or screws 21, without effecting axial compression created by the Belleville washers 32, and thus without effect on the rotational resistance to the lid 14. The pin bolts or screws 25A prevents rotation of the pin 22A, but allow slight axial movement of the pin by leaving a small gap 48 between the head of the bolts 25A and the hinge support 18A, as seen in FIG. 7.

Thus, to adjust the compressive force, the nuts 36, 38 on the alternative hinge dampening device 16A can be turned without loosening the bolts or screws 21 connecting the hinge support 18A or 20A to the bowl 12, as in the first embodiment dampening device 16.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A hinge for a particle granulator having a bowl with a lid movable between open and closed positions and having a cylindrical lid collar comprising:
   first and second spaced apart hinge supports fixed to the bowl adjacent opposite ends of the collar;
   a pin extending between the hinge supports and through the collar, and having a first end fixed to the first hinge support to preclude rotation of the pin, and a second end extending through the second hinge support;
   at least one Belleville washer adjacent the second end of the pin to exert a compressive force axially to the hinge supports and collar to create frictional resistance to rotation of the lid; and
   a nut threaded on the pin adjacent to the Belleville washer to vary the force from the Belleville washer.

2. The hinge of claim 1 further comprising bushings in the ends of the collar, and the pin extending through the bushings.

3. The hinge of claim 1 wherein the pin is stationary during movement of the lid.

4. The hinge of claim 1 wherein the pin moves axially within the collar.

5. The hinge of claim 1 wherein the compressive force is isolated from movement of the lid.

6. The hinge of claim 1 wherein the first end of the pin is secured by a bolt to the first hinge support.

7. A granulation processor for granulating particulate material, comprising:
   a bowl for mixing the material;
   a lid hinged to the bowl for movement between open and closed positions, and having a hinge collar;
   a hinge pin extending through the hinge collar of the lid and having opposite ends;
   a pair of spaced apart hinge supports mounted on the bowl and receiving the ends of the pin;
   one end of the pin being fixed to one of the hinge supports to preclude pin rotation;
   a nut on the opposite end of the pin and being threadable in opposite directions to increase and decrease pressure on the collar to adjust rotational resistance of the lid between the open and closed position; and
   at least one Belleville washer on the opposite end of the pin beneath the nut to facilitate adjustment of the rotational resistance of the lid.

8. The granulation processor of claim 7 further comprising bushings in the ends of the collar, and the pin extending through the bushings.

9. The granulation processor of claim 7 wherein the pin is stationary during movement of the lid.

10. The granulation processor of claim 7 wherein the pin moves axially within the collar.

11. The granulation processor of claim 7 wherein the compressive force is isolated from movement of the lid.

12. The granulation processor of claim 7 wherein a bolt secures the pin to the one hinge support.

* * * * *